(12) United States Patent
Gauch et al.

(10) Patent No.: US 6,196,704 B1
(45) Date of Patent: Mar. 6, 2001

(54) LIGHT, ESPECIALLY TAIL LIGHT, FOR A MOTOR VEHICLE

(75) Inventors: Winfried Hardy Gauch, Magstadt; Wolfgang Robel, Filderstadt-Sielmingen, both of (DE)

(73) Assignee: Reitter & Schefenacker GmbH (DE)

( * ) Notice: Subject to any disclaimer, the term of this patent is extended or adjusted under 35 U.S.C. 154(b) by 0 days.

(21) Appl. No.: 09/299,819

(22) Filed: Apr. 26, 1999

(30) Foreign Application Priority Data

Apr. 25, 1998 (DE) .............................................. 198 18 643

(51) Int. Cl.$^7$ ...................................................... F21V 33/00
(52) U.S. Cl. ............................................... 362/276; 362/96
(58) Field of Search ............................ 362/96, 464, 276, 362/31, 503; 239/284.1, 284.2; 250/341.8; 15/250.002

(56) References Cited

U.S. PATENT DOCUMENTS

| | | | |
|---|---|---|---|
| 3,609,450 | * 9/1971 | Hart | 362/96 |
| 3,913,840 | * 10/1975 | Kato | 239/284 |
| 4,871,917 | * 10/1989 | O'Farrell et al. | 250/341.8 |

\* cited by examiner

*Primary Examiner*—Y. Quach
(74) *Attorney, Agent, or Firm*—Robert W. Becker & Associates

(57) ABSTRACT

A light arrangement for a vehicle has a light source mounted in a reflector. A light disc is connected to the front end of the reflector in front of the light source. At least one emitter emitting a light signal and at least one receiver receiving the light signal are provided for detecting the degree of soiling of the light arrangement. The light signal travels through the light disc by total reflection to be then received by the receiver.

7 Claims, 1 Drawing Sheet

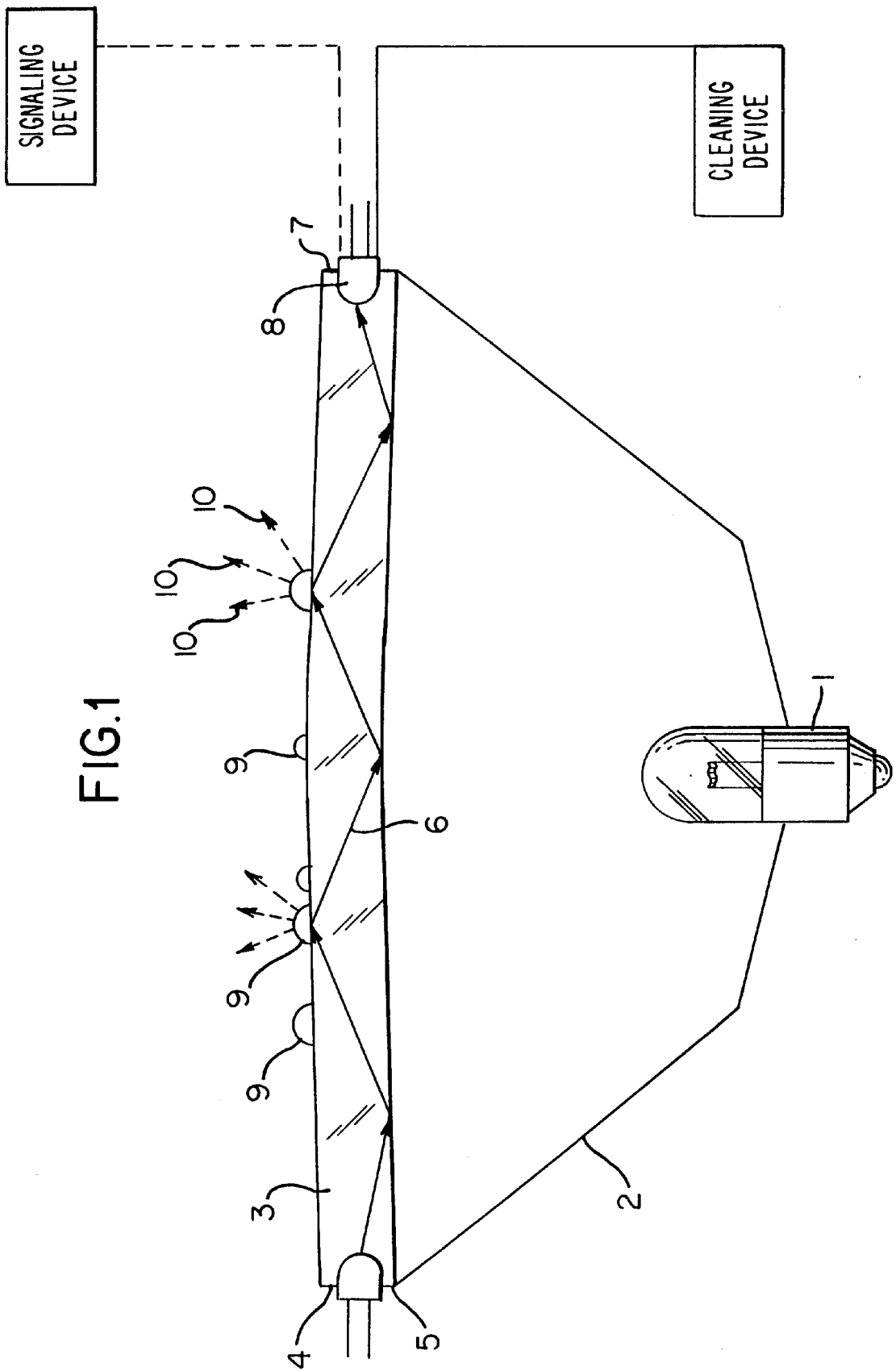

LIGHT, ESPECIALLY TAIL LIGHT, FOR A MOTOR VEHICLE

BACKGROUND OF THE INVENTION

The present invention relates to a light, preferably a tail light, for motor vehicles, comprising a light disc behind which at least one light source is arranged.

In known tail lights of the aforementioned kind its soiling has a direct effect on its illumination function. When the tail light is soiled by dust, rain etc., the light output of the light arrangement is reduced. It may even be so minimal that the light arrangement can no longer be detected by the driver of a following vehicle. Since the illumination function of such a light arrangement is important for the safety of the passengers of the motor vehicle, it is of greatest importance that the light arrangement is easibly detectable, respectively, that the light emitted by it has its full intensity.

It is therefore an object of the present invention to provide a light arrangement of the aforementioned kind that is able to detect reliably and completely at least a great degree of soiling of the light disc.

SUMMARY OF THE INVENTION

This object is solved for the light arrangement of the aforementioned kind such that for detecting the degree of soiling of the light disc at least one emitter and at least one receiver are provided, whereby the receiver detects the light signal emitted by the emitter and whereby the light signal travels through the light disc by total reflection from the emitter to the receiver.

Due to the inventive embodiment, the receiver can detect based on the amount of light received, the degree of soiling of the light disc. The degree of soiling of the light disc has a direct effect on the effective light output of the light arrangement. When a certain degree of soiling is surpassed, it is possible to clean the light disc with an automatic cleaning device or to indicate to the driver by a signaling device that there is a safety risk so that driver can then activate a cleaning device.

BRIEF DESCRIPTION OF THE DRAWING

The object and advantages of the present invention will appear more clearly from the following specification in conjunction with the accompanying drawing, in which a schematic representation in axial section of the inventive tail light is shown.

DESCRIPTION OF PREFERRED EMBODIMENTS

The present invention will now be described in detail with the aid of a specific embodiment utilizing the only FIGURE.

The light arrangement of a tail light represented in the only drawing shows a light source 1 which is embodied as an incandescent light bulb. Instead of an incandescent light bulb it is also possible to arrange a plurality of light bulbs or to employ LEDs or other suitable light sources. The light source 1 is surrounded by a reflector 2 having arranged at its front end a light disc 3. At the edge 4 of the light disc an emitter 5 is arranged. It is preferably embodied as a light-emitting diode operating in the visible or infrared light range.

The light emitted by the emitter 5 penetrates the light disc 3 and is reflected by total reflection at its outer side (see light beams 6). At the opposite edge 7 of the light disc, the light beams 6 impinge on the receiver 8 arranged thereat. It is advantageously embodied as at least one photodiode or at least one phototransistor. The receiver 8 is advantageously connected to a cleaning device for the light disc 3.

When dirt particles 9 are present on the light disc 3, for example, in the form of water droplets, dust particles, etc. the total reflection angle of the light disc 3 will change at this location. A portion of the light beams 6 is no longer reflected at the dirt particles 9 but is instead refracted (beams 10) and is thus lost to the exterior the light disc 3. Accordingly, on the receiver 8 only a portion of the light beam or signal 6 emitted by the emitter 5 will be received. The magnitude of the initial output signal of the receiver 8 thus provides indirectly information on the degree of soiling of the light disc 3.

For evaluating the strength of the received light signal 6 at the receiver 8, calibration with a clean light disc 3 advantageously is performed. The average received signal value is then used as a reference value. The sender/receiver path in the light disc 3 is advantageously operated by pulsing in order to eliminate errors of the measured signal by stray light or the light source 1. The correlation between soiling of the light disc 3 with different kinds of dirt particles 9 of different thickness and the thus resulting transmission rate of the light disc 3 is advantageously empirically determined.

The initial output signal sent from the receiver 8 to the cleaning device, whereby the magnitude of the signal is a measure for the degree of soiling of the light disc 3, is continuously compared to the reference value. When a predetermined differential value is surpassed, this means that the light disc 3 is greatly soiled. The receiver 8 sends in this case a signal to the cleaning device to actuate it.

The receiver 8 can also be connected to a signaling device which will alert the driver of the vehicle to the safety risk of the soiled light arrangement, respectively, its light disc 3. The driver can then actuate a cleaning device for the light arrangement.

In the disclosed light arrangement, the described emitter and receiver unit 5, 8 may detect the entire surface area of the light disc or at least a representative portion of the light disc 3 for determining the degree of soiling (soil particles 9). This allows for a reliable detection of the degree of soiling of the light disc 3 so that the risk of accidents resulting from a light arrangement that is not easily visible can be greatly reduced or eliminated.

The specification incorporates by reference the disclosure of German priority document 198 18 643.6 of Apr. 25, 1998.

The present invention is, of course, in no way restricted to the specific disclosure of the specification and drawings, but also encompasses any modifications within the scope of the appended claims.

What is claimed is:

1. A light arrangement for a vehicle, said light arrangement comprising:
   a light source (1) mounted in a reflector (2);
   a light disk (3) connected to a front end of said reflector (2) in front of said light source (1),
   at least one emitter (5) emitting a light signal (6) disposed on a first edge of said light disc (3) and at least one receiver (8) for receiving said light signal (6) for detecting a degree of soiling of said light arrangement disposed on a second edge of said light disc (3), wherein said at least one emitter (5) and said at least one receiver (8) are located at oppositely arranged edges (4, 7) of said light disk (3);
   wherein said light signal (6) travels through said light disk (3) by total reflection to be received by said at least one receiver (8).

2. A light arrangement according to claim 1, wherein said at least one emitter (5) emits light beams (6) within visible range of light or within the infrared range of light.

3. A light arrangement according to claim 1, wherein said at least one emitter (5) is a light-emitting diode.

4. A light arrangement according to claim 1, wherein said at least one receiver (8) is a light-emitting diode or a phototransistor.

5. A light arrangement according to claim 1, wherein said at least one receiver (8) is in communication with a cleaning device for actuating of said cleaning device upon detection of said degree of soiling by said receiver.

6. A light arrangement according to claim 5, wherein an output signal of said at least one receiver (8) is compared to a reference value.

7. A light arrangement according to claim 1, wherein said at least one receiver (8) is in communication with a signaling device for alerting a driver of said vehicle when said degree of soiling is detected by said receiver (8).

* * * * *